United States Patent [19]
Milc

[11] Patent Number: 5,440,628
[45] Date of Patent: Aug. 8, 1995

[54] OFF-HOOK TELEPHONE WITH TEMPORARY PARK FEATURE

[75] Inventor: Thomas A. Milc, Curran, Canada

[73] Assignee: Mitel Corporation, Kanata, Canada

[21] Appl. No.: 196,238

[22] PCT Filed: Aug. 21, 1992

[86] PCT No.: PCT/CA92/00357
§ 371 Date: Feb. 17, 1994
§ 102(e) Date: Feb. 17, 1994

[87] PCT Pub. No.: WO93/04548
PCT Pub. Date: Mar. 4, 1993

[30] Foreign Application Priority Data

Aug. 21, 1991 [CA] Canada ................................ 2049583

[51] Int. Cl.6 ............................................. H04M 1/00
[52] U.S. Cl. .................................. 379/422; 379/435; 379/436
[58] Field of Search ............... 379/435, 436, 428, 429, 379/422

[56] References Cited

U.S. PATENT DOCUMENTS

| | | | |
|---|---|---|---|
| 3,458,666 | 7/1969 | Stromer | 379/435 |
| 3,997,734 | 12/1976 | Clampan | 379/422 |
| 4,710,596 | 12/1987 | Kurokawa | 379/435 |

FOREIGN PATENT DOCUMENTS

| | | | |
|---|---|---|---|
| 241250 | 9/1990 | Japan | 379/428 |
| WO8800418 | 1/1988 | WIPO | 379/428 |

*Primary Examiner*—James L. Dwyer
*Assistant Examiner*—Jack Chiang
*Attorney, Agent, or Firm*—Marks & Clerk

[57] ABSTRACT

A telephone apparatus comprises a base and a handset. An inclined cradle is provided on the base for receiving the handset and is shaped such that a handset placed thereon normally falls naturally into a fully seated position. A switch responsive to the presence or absence of the handset in the cradle places the apparatus in an "on-hook" or "off-hook" condition respectively. A co-operating arrangement respectively on the handset and the base permit the handset to be temporarily retained in a partially seated position on the cradle without activating the switch so as to permit the handset to be parked temporarily on the cradle without placing the apparatus in the "on-hook" condition.

4 Claims, 1 Drawing Sheet

OFF-HOOK TELEPHONE WITH TEMPORARY PARK FEATURE

BACKGROUND OF THE INVENTION

This invention relates to the telephones, and more particularly to a telephone apparatus comprising a cradle and a handset.

Modern telephones, whether they be wall mounted or desk mounted, generally have an inclined base with two recesses for receiving a handset in the "on-hook" or idle condition. The cradle is designed such that the handset falls naturally into the fully inserted position and activates a switch that detects the presence of the handset to hang up the line. It is important to ensure that the handset, when placed approximately in the cradle, will automatically fall into the fully inserted position so as to be certain that the user will terminate the call upon hanging up the handset.

A common problem, which many people have experienced, is that when a call comes in for a different party from the one answering the phone, the answering party must put the handset down while he finds the person being called. He must take care not to place the handset in the cradle because to do so would cut off the calling party. Presently, most users place the handset on a desk or other surface, but in the case of wall mounted telephones this is not always possible and sometimes it is actually necessary to leave the handset suspended by its cord from the wall mounted phone.

JP 02-241251 describes an arrangement for retaining equipment in a holding state, which employs a displaceable holding member and an extra special switch provided for the purpose. This arrangement thus requires extra circuitry and additional moving parts, which make the device more complex and thus more expensive to manufacture.

An object of the present invention is to aleviate the aforementioned problem.

SUMMARY OF THE INVENTION

According to the present invention there is provided a telephone apparatus comprising a base and a handset, an inclined cradle provided on said base for receiving the handset and being shaped such that a handset placed thereon normally falls naturally into a fully seated position therein, switch means responsive to the presence or absence of the handset in the cradle to place the apparatus in an "on-hook" or "off-hook" condition respectively, and co-operating means respectively on said handset and said base to permit said handset to be temporarily retained in a partially seated position on said cradle without activating said switch means so as to permit said handset to be parked temporarily on said cradle while the apparatus remains in an "off-hook" condition.

The invention is especially applicable to wall-mounted telephones. In a preferred embodiment the co-operating means comprise a lip on the outer edge of the upper recess of the cradle and a corresponding notch on the inside surface of the ear piece housing. The lip and recess can engage a pivoted paddle forming part of the switch means to lock the switch means in the "off-hook" position.

The handset can thus be temporarily parked in the off hook condition on the cradle while the answering party locates the called party. The handset can in effect be seated in the cradle in two positions: 1) a temporary park position, which does not cause the telephone to hang up, and 2) a permanent position, which activates the switch to hang up the line in the conventional manner.

BRIEF DESCRIPTION OF THE DRAWINGS

The invention will now be described in more detail, by way of example only, with reference to the accompanying drawings, in which the single figure is a diagrammatic cross-sectional view of one embodiment of a telephone apparatus in accordance with the invention.

DESCRIPTION OF THE PREFERRED EMBODIMENTS

Figure 1:
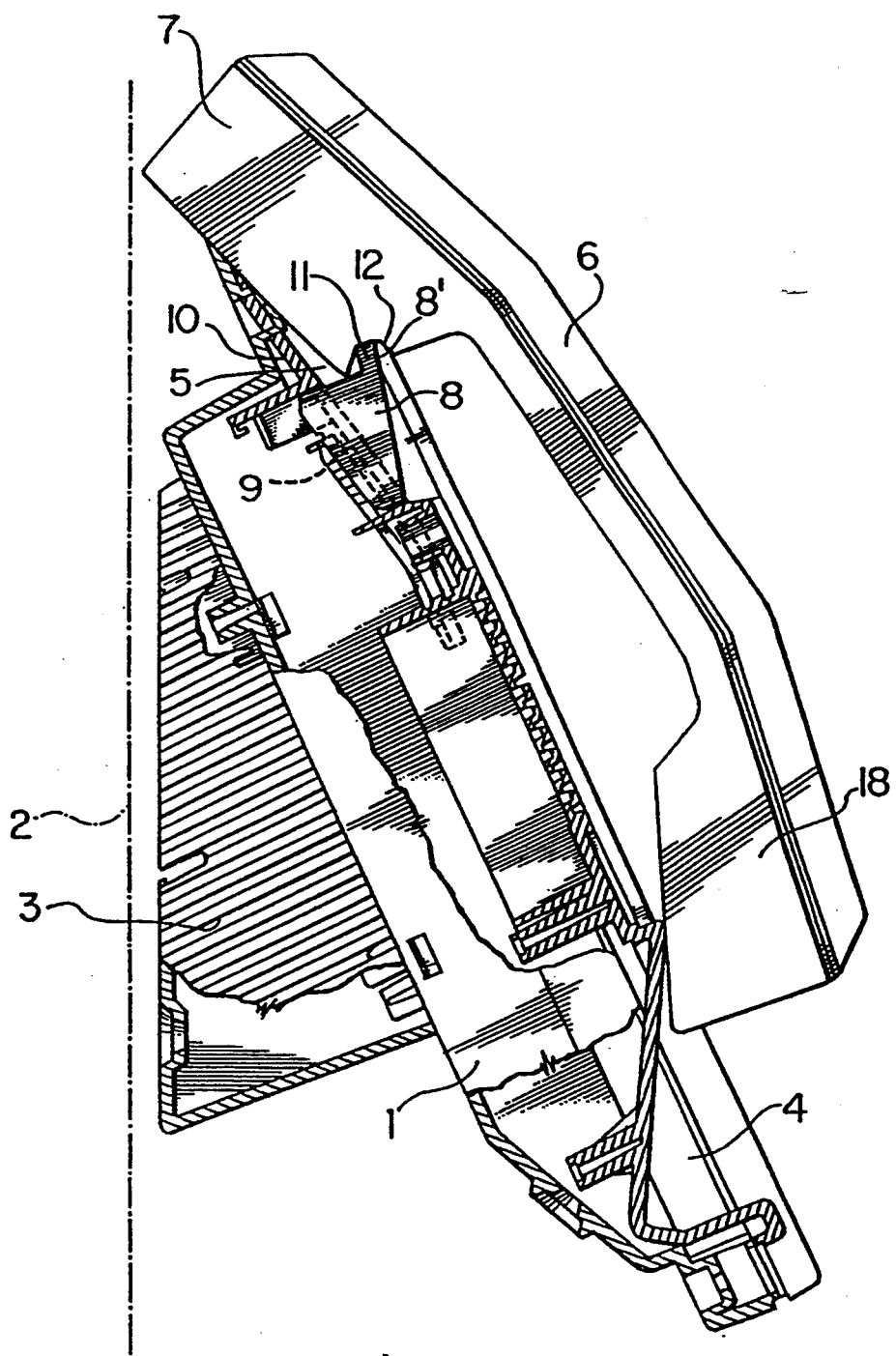

Referring now to the figure, the telephone apparatus comprises a generally rectangular base 1 mounted on a wall 2 by means of a triangular mounting bracket 3, which ensures that the base 1 extends at an incline to the vertical. The base 1 is generally of conventional configuration and provides a lower recess 4 and upper recess 5, which together form a cradle for handset 6, which has an earpiece housing 7 and a microphone housing 18. The inclination of the base 1 and the walls of the recesses 4, 5 is such that a handset 6 placed on the cradle will fall naturally into the fully inserted position as is the case with a conventional modern stylized telephone such as for example, a Mitel SuperSet TM telephone.

Within the recess 5 is located a hookswitch paddle 8. This is a pivotally mounted flap inserted in an opening 9 of the bottom wall 10 of the upper recess 5 and which is normally urged against a spring bias into the retracted position by the weight of the handset 6 when the handset is placed on the cradle. The paddle 8 forms part of a switch means that hangs up the line and places the telephone in the "on-hook" condition when the handset is placed on the cradle. Upon removal of the handset, the paddle 8 normally springs open thus placing the telephone in the "off-hook" condition.

In accordance with the invention the paddle 8 is provided with a protruding lip 11 on its upper outer edge 8'. The inside surface of the earpiece is provided with a trapezoidal shaped notch 12 that receives the lip 11 of the paddle 8 in the temporary parked position of the handset 6. When an answering party wants to be away from the phone, for example to find a called party, he places the handset 6 in the position shown in the Figure with the lip 11 engaging the notch 12 and the earpiece 7 resting in the upper recess 5 of the cradle. The weight of the handset, which normally causes it to fall naturally into the cradle, acts to urge, and thereby lock, the paddle 8 in the outermost or "off-hook" position. The answering party therefore has no fear of the telephone accidentally hanging up the line.

When the answering party returns, or the called party arrives, he can pick up the handset 6 and carry on a conversation as normal. At the end of the call, the handset is placed in the cradle, but this time with the base of the earpiece 5 firmly on the paddle 8 in the conventional manner. In the latter case, the handset falls naturally into its cradle and ensures that the telephone goes into the "on-hook" condition.

The invention is particularly useful for wall-mounted telephones, where there is often no place to rest the handset while the answering party is away from the phone. However, it is also applicable to desk mounted phones since it is much more convenient and tidier for the answering party to be able to rest the handset on its cradle rather than just place it on the desk surface.

If desired, an indicator such as a warning lamp can be provided to show that the handset is in the temporary position, although this is generally obvious from its configuration.

I claim:

1. A telephone apparatus comprising:
   (a) a base and a handset;
   (b) a stationary cradle lying in an inclined plane and provided on said base for receiving the handset and being shaped such that a handset placed thereon normally falls naturally into a fully seated position therein;
   (c) a separate switch member in said cradle displaceable out of said inclined plane between a retracted position and a protruding position in response to the presence or absence of the handset in said fully seated position to place the apparatus in an "on-hook" or "off-hook" condition respectively; and
   (d) said switch member and said handset comprising co-operating and mutually engageable means to permit said handset to be hooked onto said switch member such that the tendency of said handset to fall naturally down said inclined plane into said fully seated position urges said switch member outwardly of said inclined plane into said protruding position to permit said handset to be temporarily retained in a partially seated position on said cradle wherein said handset is parked temporarily on said cradle with the telephone apparatus remaining in the "off-hook" condition.

2. A telephone apparatus as claimed in claim 1, wherein said co-operating and mutually engageable means comprise a protrusion and co-operating recess respectively on said switch member and said handset.

3. A telephone apparatus as claimed in claim 2, wherein said protrusion comprises an upwardly projecting lip on an upper edge of a pivoted paddle in an upper recess of said cradle and forming part of said switch member and said recess comprises a notch formed on an inside surface of an earpiece housing of the handset so that when said handset is in the temporary parked position, the weight of the handset causes said lip and notch to interact to urge the pivoted paddle into the "off-hook" position.

4. A telephone apparatus as claimed in claim 3, wherein the handset comprises a microphone housing and the earpiece housing, and said earpiece housing rests on the cradle when the handset is hooked onto said switch member.

* * * * *